Nov. 20, 1973   M. C. FIELDS ET AL   3,773,897
PROCESS FOR REMOVING NITRIC OXIDE FROM GASEOUS MIXTURES
Filed Oct. 19, 1970   2 Sheets-Sheet 1

INVENTORS.
MARVIN C. FIELDS and
LADISLAUS WALTER SUMANSKY
By Gene Harsh
Attorney

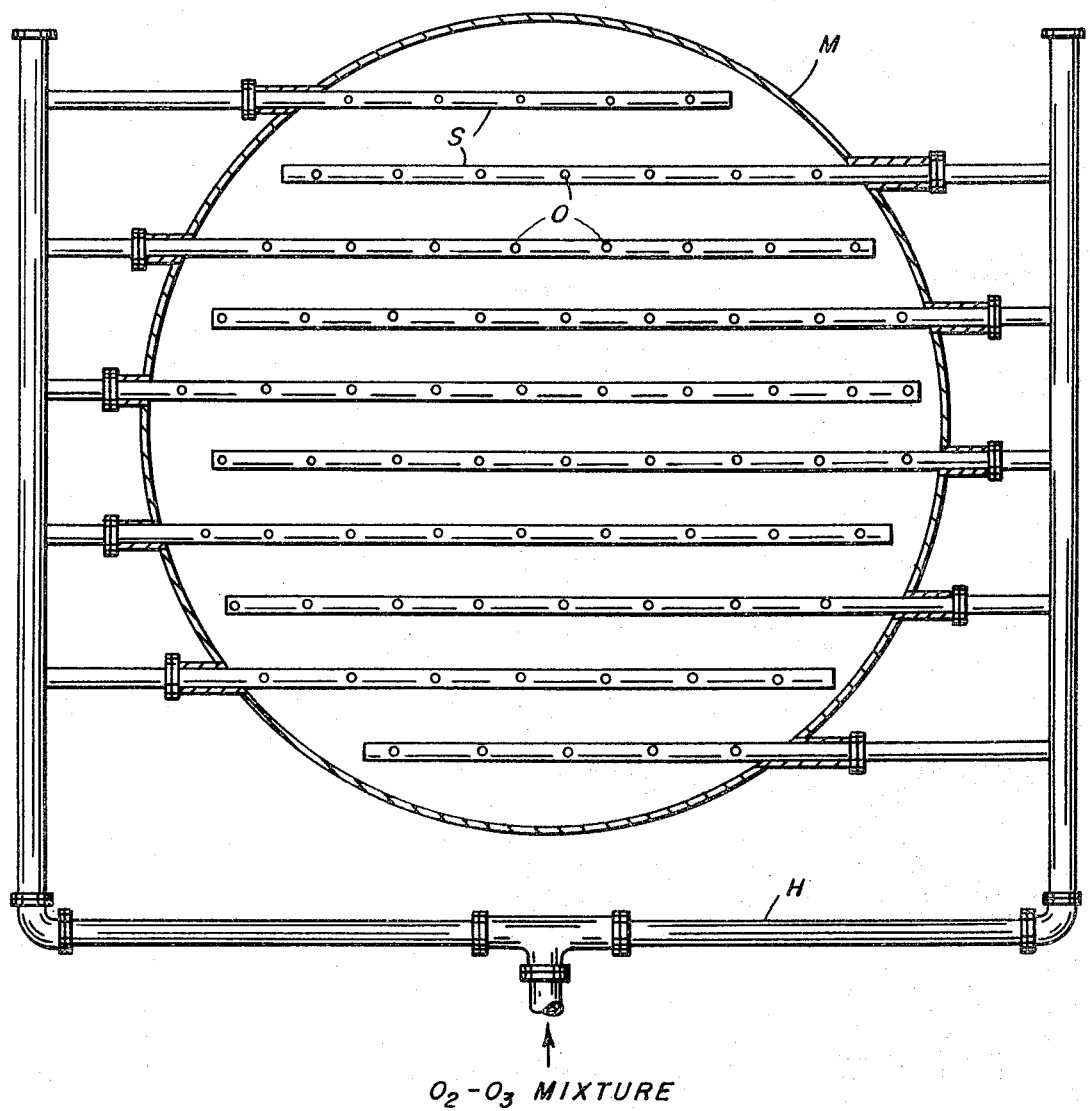

United States Patent Office 3,773,897
Patented Nov. 20, 1973

3,773,897
PROCESS FOR REMOVING NITRIC OXIDE FROM GASEOUS MIXTURES
Marvin C. Fields, Wilkins Township, Allegheny County, and Ladislaus Walter Sumansky, Library, Pa., assignors to United States Steel Corporation
Filed Oct. 19, 1970, Ser. No. 81,945
Int. Cl. B01d 53/34
U.S. Cl. 423—235                            12 Claims

ABSTRACT OF THE DISCLOSURE

A continuous process for removal of nitric oxide from coke oven gas with ozone even when its mol ratio to NO is as low as 2/1. The ozone is introduced uniformly over the cross section of the coke oven gas.

BRIEF SUMMARY OF THE INVENTION

Nitric oxide may be removed from streams of coke oven gas by continuously injecting ozone at low mol ratios into the flowing gas and by providing a uniform cross-sectional injection of ozone into the stream.

PRIOR ART

Coke oven gas (COG), after preliminary purification, may be treated in a low temperature process to separate the gas into its constituents; this is known as cryogenic processing of COG. The purified gas is first cooled; then, further cooling will separate organic hydrocarbons, hydrogen and a hydrogen-nitrogen mixture. COG is known to contain trace amounts of nitric oxide, NO, which, though present in a few parts per million, will tend to form gums that deposit upon certain parts of the cooling apparatus. These gums are an explosion hazard; their removal is expensive. Desirably, the NO is removed prior to the low temperature processing of the COG.

Among the methods proposed for the removal of NO from COG, there is the oxidation of NO to $NO_2$ and subsequent washing of the $NO_2$ and its allied products from the gas in the normal course of processing. In the Hot Bottle Method, COG is held with $O_2$ in a vessel for a sufficient time to convert NO to $NO_2$; these static processes are described in U.S. Pat. No. 3,428,414. The reaction of NO with $O_3$ in a gaseous mixture containing organic unsaturates that also react with $O_3$ has been described, B. E. Saltzman and N. Gilbert, "Ind. & Eng. Chem.," 51 (11) November 1959, pp. 1415–1420. The oxidation of NO in COG with ozone has been disclosed; Gas and Wasserfach 106, 753–6 (1956); German Pat. No. 1,278,060, (Sept. 19, 1968). It has been suggested to add chlorine dioxide to COG for oxidation of NO, Gas and Wasserfach, supra; German Pat. No. 1,085,640 (Jan. 12, 1961). However, we have discovered that problems exist when low mol ratios of $O_3$ to NO, which in consequence are low mol ratios of $O_3$ to COG, are used in gas plants of commercial size, especially when $O_3$ is added with an $O_2$ carrier. These difficulties are overcome in the practice of the invention as well as achieving benefits not possible with the prior art processes.

OBJECTS OF THE INVENTION

Among the objects of this invention are: to provide a continuous process for the reaction of NO with $O_3$ in COG streams at flow rates encountered in commercial practice; to provide for this reaction by the lowest practicable ratios of $O_3$ to NO; to provide the $O_3$ for this reaction as a component of an oxygen rich stream; to provide the reduction of NO content in the COG in a system that further processes the gas at low temperatures for the recovery of the gas constituents. These and other objects apparent from the remainder of the specification and claims are equally within the scope of this invention.

BRIEF DESCRIPTION OF THE INVENTION

Figure 1:
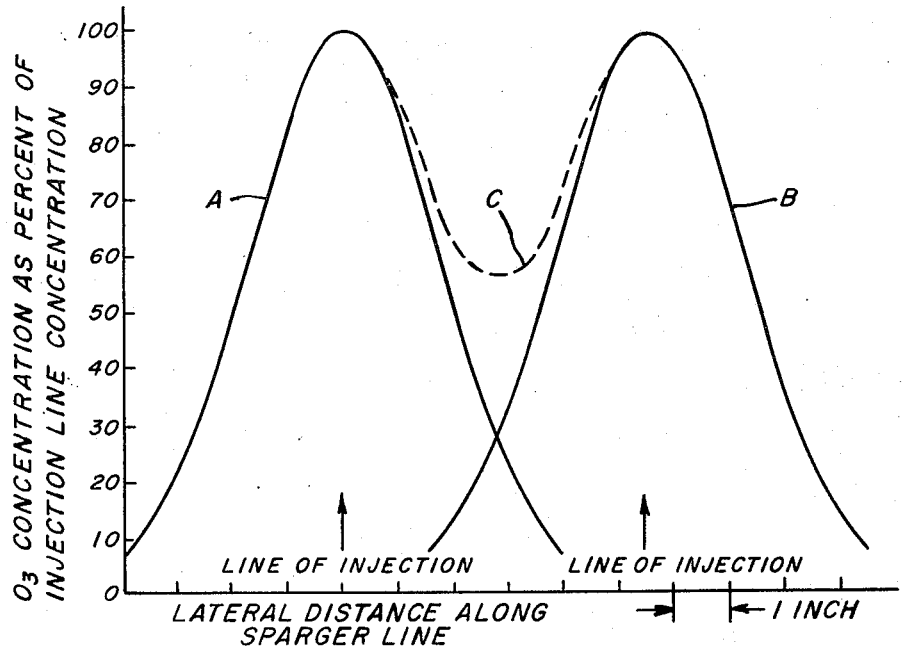
Figure 2:
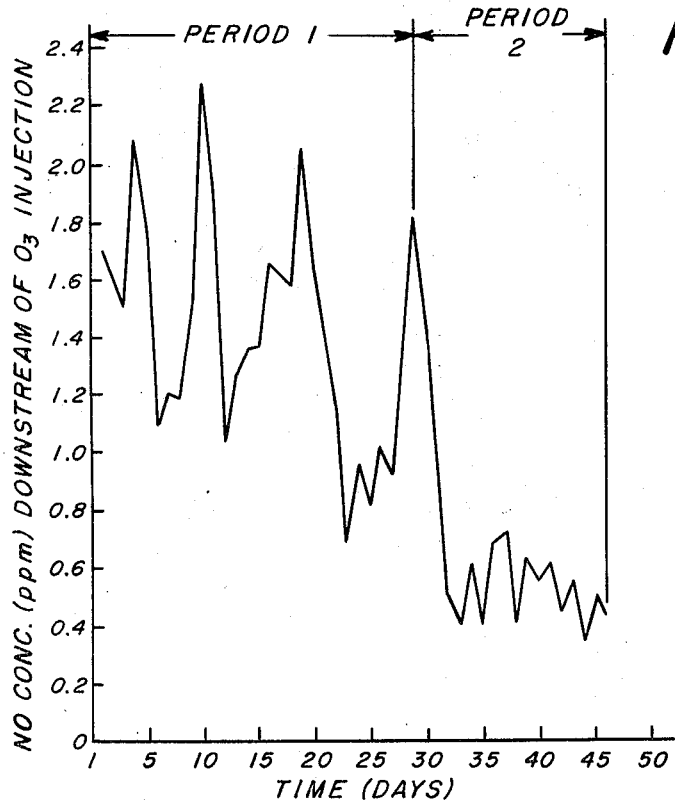

According to the invention, the NO content of COG is reduced by injecting low mol ratios of $O_3$ into the gas in such a manner that within a very short time the $O_3$ is distributed over the cross-sectional area of the gas stream, this promotes preferential consumption of NO by $O_3$. FIG. 1 illustrates a cross sectional concentration distribution of ozone 72 milliseconds (0.072 sec.) after injection by the method of this invention. FIG. 2 illustrates the NO reduction that can be obtained by the process of this invention. FIG. 3 illustrates an apparatus for use in practicing this invention.

DETAILED DESCRIPTION OF THE INVENTION

In gas plants of commercial size, to practice the invention it is necessary to introduce the ozone into the coke oven gas by a plurality of injection points uniformly distributed over the cross sectional area of the stream. This pattern tends to evenly distribute the ozone shortly after injection, within milliseconds after injection. Under the conditions of flow rate and concentration encountered with commercial gas ovens, it appears that the reaction rate for ozone with reactive constituents other than NO in the gas will cause preferential consumption of ozone at the expense of oxidizing NO unless special provision is made to rapidly distribute the ozone with the COG.

The cryogenic or low temperature processing of the COG occurs after preliminary washings have removed tars, ammonia and the like. This process is described in U.S. Pat. No. 3,101,262. A first stage cooling down to about $-110°$ C. removes hydrocarbons which contain three or more carbon atoms per molecule. A second stage cooling down to about $-145°$ C. separates out the compounds with one and two carbon atoms per molecule. A further cooling to $-180°$ C. separates the remaining carbon monoxide and methane. Hydrogen and nitrogen are separated in a succeeding wash and distillation. The liquid fractions from this process may be used to produce ethylene.

After the coke oven gas leaves the coking ovens, it is given a preliminary cooling and wash to remove tars. Then, the ozone is injected; afterwards the treated gas is washed to remove $NO_2$ and then ammonia is removed. At this point, it is ready for the low temperature processing describe above.

The COG at the time of the ozone injection contains many constituents besides NO that will react with ozone. These constituents include hydrogen sulfide, ethylene, propylene, butadiene, cyclopentadiene, cyclohexene, etc. For convenience, these constituents are hereafter referred to as reactive organic unsaturates; while the concentration of any one component may vary widely, collectively these are present in amounts of 1–6% by weight of the gas. NO is present in COG in amounts of a few parts per million, commonly about 1 to 2.5 p.p.m. While both the concentration of reactive organic unsaturates and NO may fluctuate with processing conditions and coke source, the relative concentrations will be within the above ranges. Further information concerning the compositions of COG for use in this invention may be obtained from P. M. Schulton and E. J. Neil, "The Industrial Chemist," March 1949, pp. 156–161, at pp. 156, 157; "Chemistry of Coal Utilization," Vol. II, Committee on Chemical Utilization of Coal, National Research Council, H. H. Loury, Chairman, John Wiley and Sons, 1945, at p. 929. A typical analysis of COG after it has had its primary cooling and washing is as follows:

TABLE I

| Compoent: | Percent by wt. |
|---|---|
| (1) Hydrogen | 55.14 |
| (2) Nitrogen | 2.47 |
| (3) Oxygen | 0.15 |
| (4) Carbon monoxide | 5.84 |
| (5) Carbon dioxide | 1.59 |
| (6) Ammonia | 1.09 |
| (7) Nitric oxide | 0.0001 |
| (8) Hydrogen sulfide | 0.89 |
| (9) Methane | 27.50 |
| (10) Ethylene | 2.42 |
| (11) Ethane | 0.89 |
| (12) Propylene | 0.22 |
| (13) Butadiene and other unsaturates | 0.20 |
| (14) Benzene | 0.84 |
| (15) Toluene | 0.13 |

It must be recognized that the COG contains a major proportion of substances inert to the ozone, e.g., hydrogen, nitrogen, ammonia, methane. The concentrations of these substances may vary widely; some even may be absent, for example the ammonia may be removed by prior washings. Carbonization gases from other sources besides coal are within the scope of this invention if they have analysis similar to the COG described above.

Ozone may be supplied either by itself or as a component in a stream of oxygen or air. Common commercial practice is to prepare ozone by subjecting oxygen or air to the electric discharge the mixture of ozone and air or oxygen is used rather than pure ozone. Typically, the ozone will be a small percentage of the available oxygen, e.g., 1 to 2%. Low mol ratios of ozone to NO are of particular importance when using air or oxygen streams because every mol of $O_3$ also adds 50 to 100 mols of $O_2$ to the COG. $O_2$ concentration in COG must be kept at a minimum because it will introduce a safety hazard as well as an additional expense.

The ozone is to be injected into the COG in amounts equal to mol ratios of ozone to NO in the range of about 5/1 to about 2/1. The most preferred ratio is 3/1 due to effectiveness, safety, economy and ease of mechanical construction.

By the practice of the invention, it is possible to reduce NO concentration below 1 p.p.m., preferably less than 0.5 p.p.m. Reductions in NO content in COG of at least about 50% are desired; reductions of 75% or more are possible.

Commercial size gas plants transport the COG in large pipes called mains. These mains have outside diameters ranging from about 16" to about 72". The larger the main, the more important becomes the problem which is solved by the process of this invention; therefore, it is particularly useful when applied to gas plants which have mains of at least 30" diameter. The flow conditions in the mains to which the invention is directed are flow rates of about 5 to about 200MM s.c.d.; Reynold's numbers of at least 200,000, especially those over 1 million; velocities of about 50 to about 200 ft./sec.

The relationship between pipe size, gas flow rate and gas velocity is illustrated by the following Table II.

TABLE II

| Diameter of main, inches std. pipe size: | Coke-oven gas flow |
|---|---|
| 16 | 9.9 |
| 20 | 15.4 |
| 30 | 34.7 |
| 54 | 112 |
| 60 | 139 |
| 72 | 200 |

The configuration of the apparatus for providing the multiplicity of injection points and consequent uniform distribution of ozone may be obtained from the following considerations. It is most desirable that the concentration profile of $O_3$ downstream from the injection area be such that the minimum ozone concentration be about one-half the maximum ozone concentration when this minimum concentration equals the concentration of NO. Assuming a constant concentration of unsaturates, applying the rate equation for the reaction of unsaturates with ozone will give the time at which "unconsumed" ozone is present in about twice the concentration of NO; cf. T. Vibraski and R. J. Cvetanovic, Canadian Journal of Chemistry, 38, 1053 (1960) at p. 1058. With the velocity of the COG, the distance travelled by the gas corresponding to the elapsed olefinic reaction time may be calculated. Spacing of injection points may be determined by then applying the concentration distribution equation $$C = \frac{Q}{4\pi E R} C^{-(U/2E)(R-X)}$$

given on p. 42 of Sherwood and Pigford, Absorption and Extraction, 2d ed., McGraw-Hill Co. (1952), New York.

The final injection pattern will consider the re-enforcing effect of two or more adjacent orifices on the distribution of ozone. In FIG. 2, the individual concentrations from two adjacent orifices are plotted as the solid lines A and B, the additive effect is shown as a dotted line C. Spacing of orifices will be from 4" to 7" apart, corresponding to a distance of 2" to 3.5" for the gas from any single orifice. Of course, the most common pipe diameters for gas mains in practice are from 24" to 54"; therefore the selection of suitable materials and types of injectors will be made according to well known factors of safety, ease of operation, ease of installation and durability.

EXAMPLE 1

The implementation of the invention is illustrated as follows: 112MM s.c.f.d. of COG with an analysis such as in Table I, which contains 1.5 p.p.m. of NO is flowing through a 54" main. To this gas is added 35 c.f.m. of an ozone-oxygen mixture, from an ozone generator, which contains one percent ozone. This provides 3 moles of ozone for each mole of NO in the untreated COG. This ozone containing stream is introduced into the main through the injection apparatus shown in FIG. 3, more particularly described below. The coke oven gas so treated has its NO content reduced 75% to 0.375 p.p.m. The oxidation products are washed from the gas. Then the gas is subjected to the low temperature cooling described above from which hydrogen, ethylene and other constituents are recovered.

FIG. 2 illustrates the results of this invention. Period 1 represents the concentration of NO in COG when all the ozone is introduced at the center of the main, no reduction in NO concentration is observed. Period 2 represents the concentration of NO in COG after treatment in the manner of Example 1. The substantial reduction in NO concentration is apparent.

FIG. 3 illustrates the distribution apparatus for a gas velocity of 95 ft./sec., a 3/1 mol ratio of $O_3$ to NO and a half reaction time of 0.072 second. Individual sparger pipes (S) extend across the cross sectional area of a 54 gas main (M). The sparger pipes have holes known as orifices (O). The ozone-oxygen mixture is transmitted via the header (H). These orifices are spaced 5½" from each other; the sparger pipes are 4½" apart. This creates equilateral triangles among the orifices having each orifice 5½" from the others.

For large gas plants the benefits of continuous processing are evident. This invention not only provides a simple and effective reduction of NO content. It is also useful for COG gas compositions varying over a wide range; which means it can be used in locations where the composition of the COG fluctuates.

While the invention has been described by reference to specific modes of performance, it is not limited thereto.

Other conventional means to achieve the same objectives by application of the same principles are equally within the scope of this invention.

We claim:

1. A method for continuously processing coke oven gas comprising, reducing by at least about 50% the nitric oxide content of said gas by the steps of:
   (a) introducing ozone into said gas through a plurality of independent streams substantially uniformly distributed over the cross section of said gas with a spacing of about four inches to about seven inches between said streams, said ozone being introduced in an amount equal to a mol ratio of ozone to nitric oxide in the range of about 5/1 to about 2/1; said nitric oxide being present in the untreated gas in amounts up to a few parts per million, said gas having been given a preliminary cooling and washing to remove tars and also containing reactive organic unsaturates in amounts of about 1% to 6% by weight; said gas flowing at a rate of about 5 to about 200 MM s.c.f.d. and at velocities of about 50 to about 200 ft./sec.; and
   (b) washing the nitrogen reaction products from said gas.

2. The method of claim 1 wherein the ozone is introduced in a stream, said stream being air or oxygen that has been subjected to the electric discharge for creation of said ozone.

3. The method of claim 2 wherein the mol ratio of ozone to nitric oxide is about 3/1.

4. The method of claim 1 wherein the coke oven gas is flowing in at least an amount equivalent to 34.7 millions of standard cubic feet per day at 95 ft./sec.

5. The method of claim 4 wherein the ozone is introduced in a stream, said stream being air or oxygen that has been subjected to the electric discharge for creation of said ozone.

6. The method of claim 5 wherein the mol ratio of ozone to nitric oxide is about 3/1.

7. A method for continuously processing coke oven gas comprising:
   (a) reducing by at least about 50% the nitric oxide content of said gas by the steps of:
      (i) introducing ozone into said gas through a plurality of independent streams substantially uniformly distributed over the cross section of said gas with a spacing of about four inches to about seven inches between said streams, said ozone being introduced in an amount equal to a mol ratio of ozone to nitric oxide in the range of about 5/1 to about 2/1; said nitric oxide being present in the untreated gas in amounts up to a few parts per million, said gas having been given a preliminary cooling and washing to remove tars also containing reactive organic unsaturates in amounts of about 1% to 6% by weight, said gas flowing at a rate of about 5 to about 200 MM s.c.f.d. and at velocities of about 50 to about 200 ft./sec.,
      (ii) washing the nitrogen reaction products from said gas, removing ammonia from said gas, and
   (b) cooling the treated gas to low temperatures and thereby separating the gas into its organic components and hydrogen and nitrogen.

8. The method of claim 7 wherein the ozone is introduced in a stream, said stream being air or oxygen that has been subjected to the electric discharge for creation of said ozone.

9. The method of claim 8 wherein the mol ratio of ozone to nitric oxide is about 3/1.

10. The method of claim 7, wherein the coke oven gas is flowing in at least an amount equivalent to 34.7 millions of standard cubic feet per day at 95 ft./sec.

11. The method of claim 10 wherein the ozone is introduced in a stream, said stream being air or oxygen that has been subjected to the electric discharge for creation of said ozone.

12. The method of claim 11 wherein the mol ratio of ozone to nitric oxide is about 3/1.

References Cited

FOREIGN PATENTS

| 1,364,716 | 5/1964 | France | 23—2 E |
| 1,278,060 | 9/1968 | Germany | 23—2 R |

UNITED STATES PATENTS

Saltzman et al.: "Ozone Reaction With 1-Hexene," Ind. and Eng. Chem., vol. 51, No. 11, November 1959, pp. 1415–1420.

EARL C. THOMAS, Primary Examiner

U.S. Cl. X.R.

423—237

UNITED STATES PATENT OFFICE
CERTIFICATE OF CORRECTION

Patent No. 3,773,897               Dated November 20, 1973

Inventor(s) Marvin C. Fields, et al.

It is certified that error appears in the above-identified patent and that said Letters Patent are hereby corrected as shown below:

Column 3, line 31, insert a semi-colon -- ; -- after "discharge"

line 65, Table II, title of second column should read -- Coke-Oven Gas Flow (Dry Basis), Millions of Std. Cubic ft. per Day (MMSCFD) for a Velocity of 95 ft/sec --.

Signed and sealed this 30th day of April 1974.

(SEAL)
Attest:

EDWARD M. FLETCHER, JR.
Attesting Officer

C. MARSHALL DANN
Commissioner of Patents